Dec. 4, 1956  P. F. A. M. HENDRIKS  2,773,042
PROCESS OF AND APPARATUS FOR REGULATING THE
COMPOSITION OF VAPOR-GAS MIXTURES
Filed Dec. 4, 1953  2 Sheets-Sheet 1

INVENTOR
Petrus F. A. M. Hendricks
By Cushman, Darby & Cushman
ATTORNEYS

United States Patent Office 2,773,042
Patented Dec. 4, 1956

2,773,042

PROCESS OF AND APPARATUS FOR REGULATING THE COMPOSITION OF VAPOR-GAS MIXTURES

Petrus F. A. M. Hendriks, Sittard, Netherlands, assignor to Stamicarbon N. V., Heerlen, Netherlands Application December 4, 1953, Serial No. 396,163

Claims priority, application Netherlands December 12, 1952

2 Claims. (Cl. 252—372)

This invention relates to a process of and apparatus for regulating the composition of vapor-gas mixtures.

The invention will be described in terms of one of its principal applications, namely, the measurement and regulation of the composition of the blast of ovens and producers, such as are used in the preparation of generator gas, oxygas (oxygen-blown producer gas), calcium carbide and the like. As will be evident, the invention is equally adapted for utilization in a variety of other applications, in which vapor-gas mixtures are employed.

The blast used in ovens and producers of the types mentioned comprises mixtures of steam and air, steam and oxygen-enriched air, or steam and oxygen. For example, revolving grate producers used for the preparation of lean gas are fired with a steam-air mixture containing from 15 to 20% steam. Oxygas is prepared in revolving grate producers by using a blast comprising between 70 and 80% steam, and from 30 to 20% technical oxygen. Oxygas producers with liquid slag removal use steam-oxygen mixtures containing about 50% steam, while the blast employed in the preparation of calcium carbide may, for example, comprise technical oxygen containing from 40 to 15% steam.

In order to insure efficient operation of these producers and ovens, the composition of the blast should be maintained constant, or within narrow limits. In prior practice this is usually achieved by measuring the quantities of steam and gas before mixing, the measurement being effected in some cases by means of metering orifices. In such case, however, accurate and consistent results can be obtained only if the steam is superheated to such high degree that even after the mixing has been accomplished, the resultant gas mixture is still unsaturated. For this reason, it is commonly necessary to provide superheaters for the steam. If the mixture contains relatively little steam, the steam supplied must be superheated to such a high degree that the procedure is impractical.

Another known method of checking the composition of a blast obtained by mixing steam with air or oxygen is based on temperature measurement of the resultant mixture. As will be apparent, if the resulting blast is saturated with water vapor, the temperature measured will correspond to the dew point, from which the composition of the mixture may be readily calculated. When using this method, it is necessary that water droplets which may be present in the gas mixture be separated and removed by mechanical means, since water drops present might possibly evaporate and accordingly change the composition of the steam-gas mixture, in which case the composition would no longer correspond to that determined by the temperature measurement.

The determination of the composition, based on temperature and dew point measurement, is practical for steam-air mixtures containing up to about 30% steam. At concentrations exceeding this value, however, the indicated results are often erroneous, especially if the steam provided varies in temperature, or if the composition of the mixture must be varied considerably in the course of the process. In the latter case, there is always the possibility that the mixture obtained by mixing the steam with the cold gas will not be saturated with water vapor, in which event the temperature determined will not indicate the dew point, and the indicated composition will be erroneous.

The present invention obviates this difficulty, and provides a method and apparatus in which the composition of the blast may be regulated in a simple manner, continuously and automatically.

In regulating the composition of a steam containing blast according to the present invention, the steam supplied is first saturated by cooling, and subsequently mixed with air or oxygen of such a low temperature as to insure that the resulting blast mixture will be saturated with water vapor. Thereafter, the blast is led through a water drop separator. The temperature of the saturated blast is measured, and this temperature measurement is utilized to control and regulate the steam supply. The saturated blast may thereafter be heated so as to become unsaturated and then supplied or transported to the place of consumption, for example an oven or producer. In this procedure, it is obviously advantageous from the viewpoint of heat economy that the heat released during the initial cooling of the supplied steam be utilized subsequently for reheating the blast.

By utilizing a temperature gauge adapted to transmit impulses to a regulating device controlling the position of a regulating valve in the steam line, the dew point of the saturated blast may be maintained constant, and accordingly the composition of the blast may be maintained constant, or within narrow limits. The quantity of blast to be supplied to the oven or producer may be precisely and entirely controlled by adjustment of a regulating valve in the feed line of the oxygen-containing gas.

The manifold advantages of the invention will be evident. Since the blast is reheated after the dew point determination, and accordingly becomes unsaturated, condensation of water will not alter the composition of the blast during transport to the point of utilization. The entire regulation is effected without any appreciable overall addition or elimination of heat. Since, due to the superheating, the vapor-gas mixture becomes limpid, the interior of the producer or oven may conveniently be observed through the burners, and the temperature prevailing in the producer or oven may be determined optically. A most outstanding advantage resides in that the regulation may be utilized for vapor-gas mixtures of widely varying composition, and with steam of greatly fluctuating temperature and pressure, without possibility of error.

The invention may be more readily understood by reference to the following description and the accompanying drawings, in which.

Figure 1:
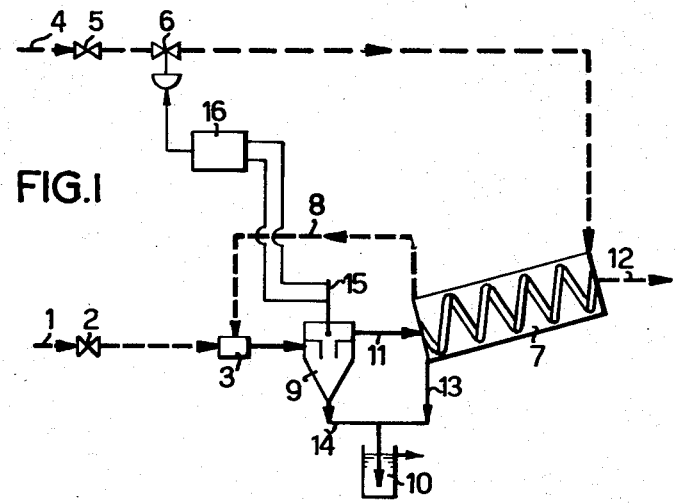
Figure 1 is a diagrammatic illustration of an exemplary embodiment of the invention.

Referring to Figure 1, oxygen-containing gas is supplied to a mixer 3 through line 1 and regulating valve 2. Steam is supplied through the line 4 and valve 5 therein. The steam passes through a regulating valve 6, and then through a heat exchanger 7, wherein it is cooled at least to the point of saturation. Thereafter, the saturated steam passes through line 8 to the mixer 3. The vapor-gas mixture issuing from mixer 3 passes through a water separator 9, which may be in the form of a cyclone, line 11, heat exchanger 7, and emerges from the system by means of line 12. The mixer 3 and water separator 9 may be a single device capable of performing both functions.

In heat exchanger 7, the vapor-gas mixture absorbs heat from the incoming steam, whereby the heated mixture is no longer saturated with water vapor. The incoming live steam is cooled at least to the point of saturation, and the water which separates off may be drained through line 13 into steam trap 10. The water removed in the water separator 9 may similarly be drained through line 14 into the trap 10.

A temperature gauge may be fitted into the water separator, as shown, or into the gas line 11 beyond the water separator. Various types of temperature gauges may be utilized, the contact thermometer 15 being entirely suitable. Impulses transmitted by the contact thermometer are utilized to govern a regulator 16, which in turn operates regulating valve 6. By proper design of the regulator 16 the dew point, as measured by thermometer 15, will remain constant and will be independent of the quantity of oxygen-containing gas supplied, within an extremely narrow regulating range. Accordingly, the quantity of mixture may be simply and completely regulated by adjusting the regulating valve 2 in gas line 1. The composition of the mixture may be readily varied by adjustment of the regulator 16, or in the specific embodiment, by adjusting the contact thermometer 15.

Figure 2:
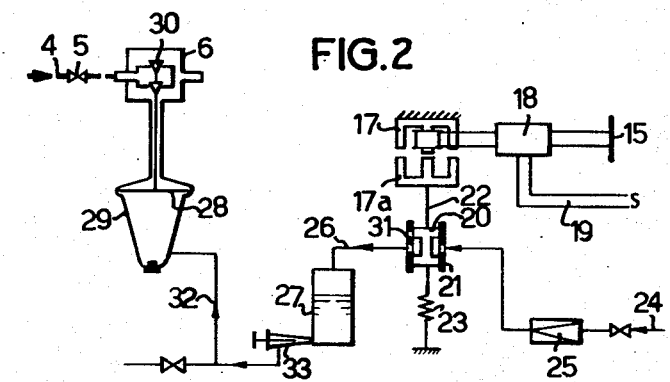
Figure 2 is a diagrammatic illustration of a preferred regulating system.

Figure 2 illustrates, in more detail, a regulating mechanism suitable for use with the system of Figure 1. Like reference numerals are used to indicate like elements. As shown in Figure 2, the contact thermometer 15 utilized for determining the dew point makes or breaks the circuit of an electromagnet 17 by means of a relay 18, power being supplied through lines 19. As a result, an anchor 17a of the electromagnet is attracted or released, and the anchor 17a in turn operates the piston 20 of governor valve 21 by means of link 22. Release of the electromagnet anchor is assisted by spring 23.

Compressed air is supplied to the governor valve 21 through line 24 and reducing valve 25, and possibly also through a filter (not shown). When the governor valve piston 20 is in its lowest position, as shown, the compressed air is conveyed through line 26 and presses on the surface of a body of liquid in reservoir 27. The pressure of the liquid is transmitted to the diaphragm 28 of the actuating device 29 of regulating valve 6 in the steam line 4. Increase in pressure against the underside of diaphragm 28 tends to lift (open) the valve members 30 in the regulating valve, thereby increasing the flow of steam supplied through line 4.

When the piston 20 of governor valve 21 is raised to top position by the action of electromagnet 17, the compressed air in line 26 may flow out of port 31 of the governor valve, whereby the pressure over the liquid in reservoir 27 is released, and liquid may flow back from the actuating device 29 into the reservoir. Release of pressure against the underside of diaphragm 28 permits the valve members 30 to fall (close), thereby correspondingly decreasing the flow of steam from line 4. Fitted into the liquid line 32 extending between the actuating device 29 and reservoir 27 is a needle valve 33, by means of which the resistance of flow of the liquid, and hence also the response rate of the regulating valve 6, may be adjusted, the needle valve 33 functioning solely as an adjustable damping device.

If the temperature (dew point) measured lies above the value or range to which the contact thermometer has been adjusted, the air pressure on the liquid in reservoir 27 is accordingly released, and the steam regulating valve 6 slowly closes, as a result of which the water vapor content, and hence also the dew point, of the saturated vapor-gas mixture starts to fall. On the other hand, if the temperature measured falls below the temperature to which the contact thermometer has been adjusted, compressed air is admitted again into the space over the liquid in reservoir 27, and the valve members 30 are lifted, whereby the rate of flow of steam is increased, and consequently the dew point of the saturated vapor-gas mixture starts to rise.

As will be evident, the regulation of the steam flow in accordance with the temperature of the vapor-gas mixture may be effected in a number of equivalent ways. Instead of a contact thermometer, other temperature gauges may be used, for example a temperature gauge which gives off impulses directly proportional to the rate at which the dew point starts deviating from the set value. These impulses may be amplified and then transmitted electrically or hydraulically to the actuating device 29 of the regulating valve 6.

Figure 3:
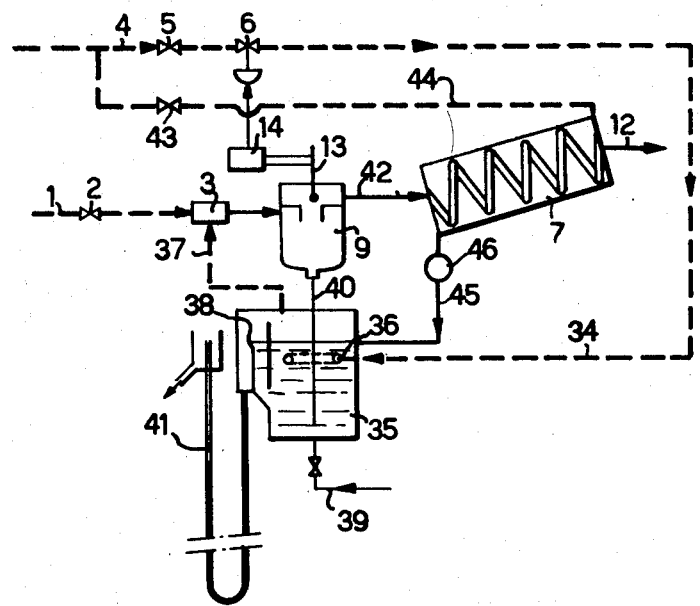
Figure 3 is a diagrammatic illustration of a variation of the system of Figure 1.

A variation of the apparatus according to Figure 1 is schematically illustrated in Figure 3, wherein again like numerals are used to indicate like elements. In the embodiment of Figure 3, the steam supplied through line 4, valve 5 and regulating valve 6 passes through line 34 directly into the steam moistening device 35, where the steam escapes through a perforated ring 36 disposed below the surface of a body of water. In this manner it is insured that the steam, which then passes through line 37 to the mixing device 3, is saturated. The water level in the steam moistening device 35 may be maintained constant by means of the overflow 38.

Water may be supplied to the moistening device 35 by means of a separate line 39, and also by means of the discharge conduit 40 from water separator 9. The water may be carried off from the moistening device 38 through U-tube 41. It is essential that the leg of the U-tube be made sufficiently long to adequately absorb pressure impulses in the system.

For the purpose of superheating the blast which is supplied through line 42 to the heat exchanger 7, low pressure steam is bled from line 4 and conveyed to the heat exchanger through reducing valve 43 and line 44. The condensate formed in the heat exchanger may be supplied to the steam moistener 35 by means of line 45, which includes a steam trap 46.

As in the system of Figure 1, the mixing ratio of the vapor and gas is controlled by first saturating the vapor, and then mixing the vapor with the gas, the resulting vapor-gas mixture being also saturated. The rate of flow of the vapor is controlled in accordance with the temperature of the saturated vapor-gas mixture. The saturated mixture passes through a liquid separator, and is subsequently heated, preferably in heat exchanging relation with the vapor supply, or at any rate a portion of it, as a result of which the mixture becomes unsaturated with vapor. The invention is obviously adapted for utilization with vapors other than steam, and with gases other than air, oxygen or mixtures thereof.

I claim:

1. Process of regulating the composition of steam-oxygen containing gas mixtures comprising the steps of separately supplying steam and gas, saturating the steam by cooling, mixing the saturated steam with the gas, the temperature of the gas being such that the resultant mixture is steam saturated, removing water condensate from said mixture, detecting the temperature of said saturated steam-gas mixture, controlling the rate of steam supply in accordance with said detected temperature, and subsequently reheating the steam-gas mixture with the heat which has been removed in saturating the steam.

2. Apparatus for regulating the composition of steam-oxygen containing gas mixtures comprising means for supplying steam, heat exchanger means for cooling said steam whereby it may be saturated, means for supplying gas, means for mixing said gas and said saturated steam, means for removing steam condensate from the steam-gas mixture, means for controlling the rate of steam supply in accordance with the temperature of said steam-gas mixture, and means for conducting said steam-gas mixture through said heat exchanger, whereby the mixture is reheated by the heat extracted from said steam.

References Cited in the file of this patent

UNITED STATES PATENTS

| | | |
|---|---|---|
| 1,265,480 | Morison | May 7, 1918 |
| 1,915,971 | Beane et al. | June 27, 1933 |
| 2,141,116 | Van Ackeren | Dec. 20, 1938 |
| 2,258,515 | Nowat | Oct. 7, 1941 |
| 2,550,683 | Fletcher et al. | May 1, 1951 |
| 2,610,837 | Puster | Sept. 16, 1952 |